(12) United States Patent
Abecasis et al.

(10) Patent No.: US 9,344,142 B2
(45) Date of Patent: May 17, 2016

(54) COMMUNICATION SYSTEM AND A METHOD FOR MITIGATING LEAKAGE SIGNALS

(71) Applicant: DSP Group LTD., Herzeliya (IL)

(72) Inventors: Yaki Abecasis, Herzelia (IL); Adir Levi, Kfar Saba (IL)

(73) Assignee: DSP GROUP LTD., Herzeliya (IL)

( * ) Notice: Subject to any disclaimer, the term of this patent is extended or adjusted under 35 U.S.C. 154(b) by 0 days.

(21) Appl. No.: 14/569,808

(22) Filed: Dec. 15, 2014

(65) Prior Publication Data

US 2015/0180533 A1  Jun. 25, 2015

Related U.S. Application Data

(60) Provisional application No. 61/919,834, filed on Dec. 23, 2013.

(51) Int. Cl.
*H04B 1/525* (2015.01)
(52) U.S. Cl.
CPC .................... *H04B 1/525* (2013.01)
(58) Field of Classification Search
CPC ....................................... H04B 1/525
See application file for complete search history.

(56) References Cited

U.S. PATENT DOCUMENTS

2002/0080728 A1*  6/2002  Sugar et al. .................... 370/252
2004/0106381 A1*  6/2004  Tiller .............................. 455/73
2013/0155913 A1*  6/2013  Sarca ............................ 370/277

* cited by examiner

*Primary Examiner* — David Bilodeau
(74) *Attorney, Agent, or Firm* — Reches Patents

(57) ABSTRACT

A communication system that includes a transmit antenna, a radio frequency (RF) phase shifting module, an RF combiner, a first receive antenna and a second receive antenna; wherein the first and second receive antennas are located at a same distance from the transmit antenna; wherein the first and second receive antennas are arranged to receive first and second leakage signals resulting from a transmission of RF radiation by the transmit antenna; wherein the RF phase shifting module is configured to receive signals from the first and second receive antennas, to phase shift signals from at least one of first and second receive antennas to provide intermediate RF signals; wherein the phase shift caused by the RF phase shifting module introduces a destructive phase shift between the first and second leakage signals; wherein the RF combiner is configured to add the intermediate RF signals to provide combined RF signals.

22 Claims, 15 Drawing Sheets

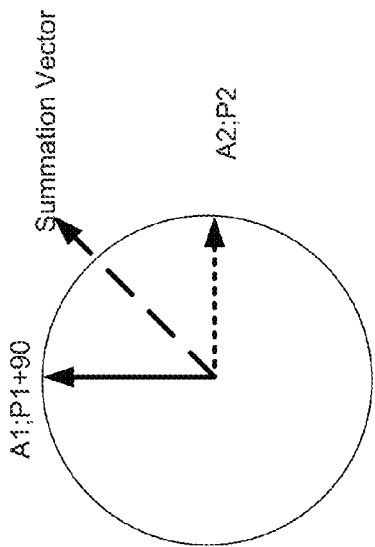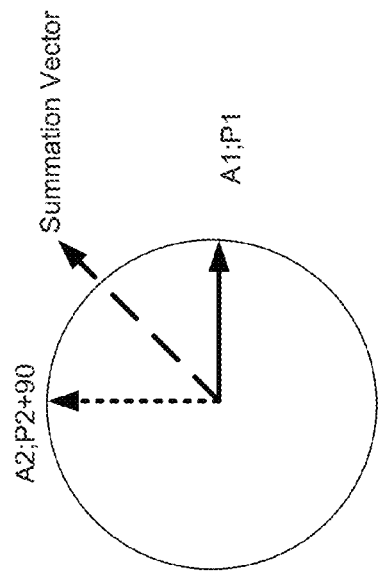
FIG. 8

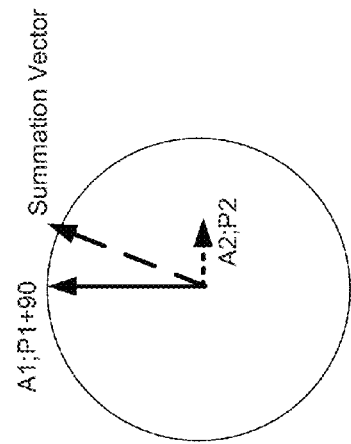
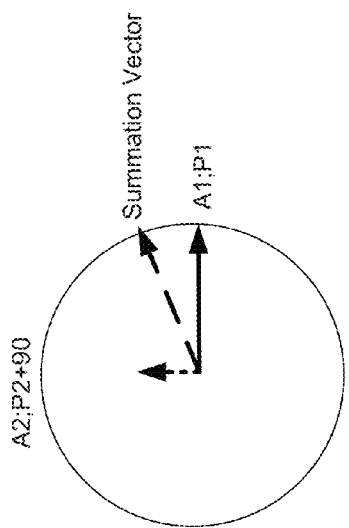
FIG. 9

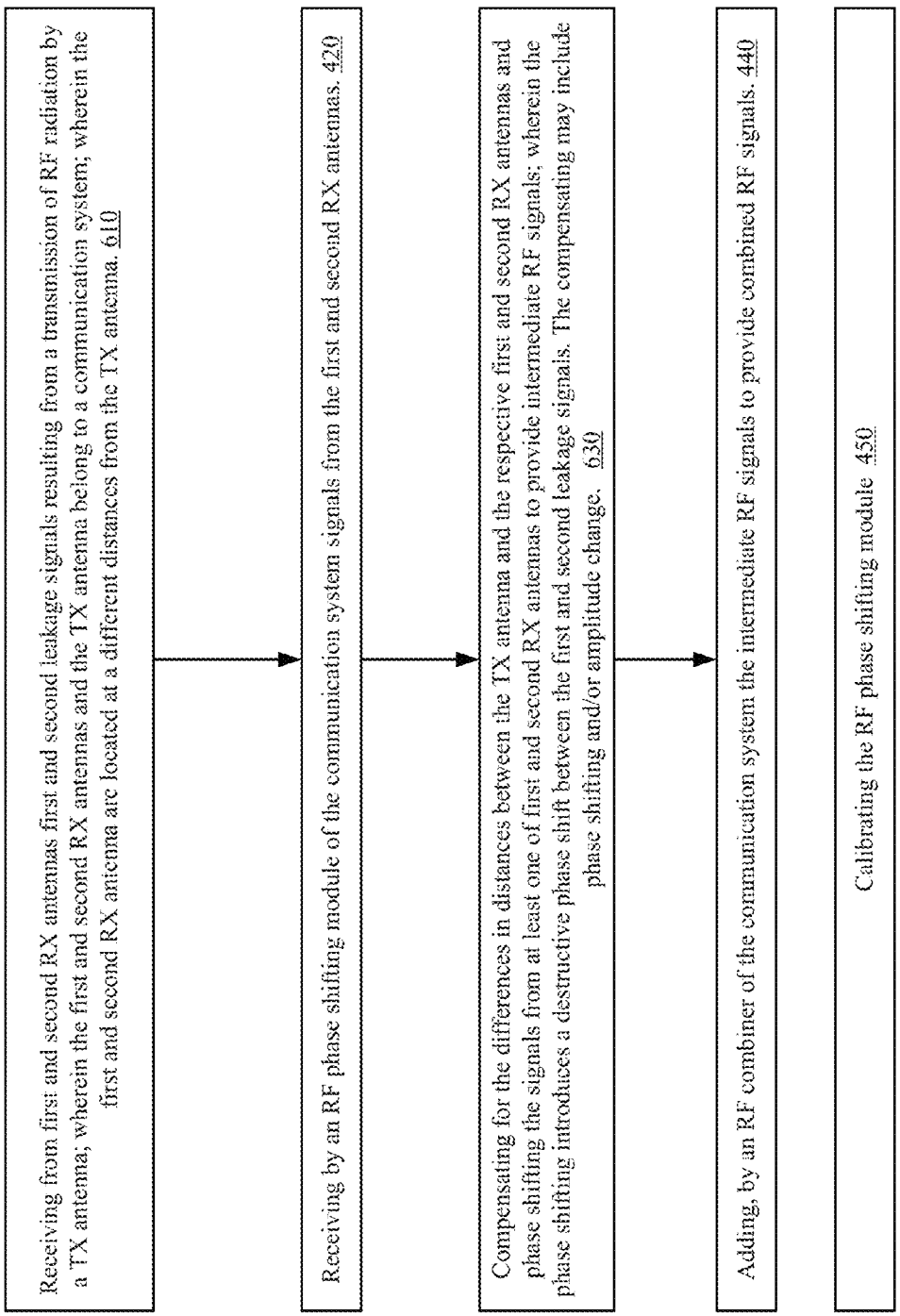

COMMUNICATION SYSTEM AND A METHOD FOR MITIGATING LEAKAGE SIGNALS

RELATED APPLICATIONS

This patent application claims priority from U.S. provisional patent Ser. No. 61/919,834 filing date Dec. 23, 2014, which is incorporated herein by reference.

BACKGROUND TO THE INVENTION

In many stationary and mobile devices, the radio transmitter and the radio receiver may be active at the same time due to the various radio frequency (RF) systems that are present in the device. As the number of RF systems has increased, not only is it likely that simultaneous receiving and transmitting of different signals is present but also that the frequency difference between them is insufficient for simple isolation to be achieved using inexpensive duplexers and filters, if at all possible. A well know technique to reduce the interference and to improve the coexistence of different RF signals is to use a pair of transmission (TX) antennas and a single reception (RX) antenna as illustrated in FIG. 1 that shows a prior art communication system 10.

The signal to be transmitted (transmitted signal 31) is split (by splitter 14) and applied to two TX antennas A and B (12 and 13) which are spaced greater than half a wavelength apart. TX antennas A and B 12 and 13 transmit RF radiation—22 and 23 respectively. The RX antenna 11 receives a wanted (far field) signal 21 as well as unwanted receive signals A and B 23 and 25 from TX antennas A and B.

In FIG. 1, the distance between the TX antenna B 13 and the RX antenna 11 is D 41 and the distance between the TX antenna A 12 and the RX antenna 11 is D+$\lambda$/2 42, where $\lambda$ is the wavelength of the signal. Hence at the RX antenna 11, the signal (unwanted receive signal A 23) received from TX antenna A 11 is exactly out of phase with the signal (unwanted receive signal B 25) received from TX antenna B 13. The result being that the sum of the two signals 23 and 25 received from TX antennas A and B is at a much attenuated level compared to the signal at either antenna A or B. Attenuations of about 35 dB can be obtained when using this scheme. FIG. 4 illustrates a summation of leakage signals by RX antenna 11.

Referring back to FIG. 1, also of concern is that the closer a TX antenna is to the RX antenna, the higher the unwanted signal that has to be attenuated and the larger the difference between the signals at the two receive antenna.

In general, referring to FIG. 1, the signal strength at the RX antenna 11 from TX antenna B 13 will be stronger than that at RX antenna 11 due to the signal from TX antenna A 12. This would have to be compensated for by attenuating the power of the TX transmission from TX antenna B 12, as shown by the variable attenuator 15 that attenuates signals 33 to provide attenuated signal 34 while signal 32 that is fed to TX antenna A 12 is not attenuated. Variable attenuator 15 is located in the signal path from the splitter 14 to the base of TX antenna B 13. This could be seen as inefficient and a waste of energy. For example, if the distance D is $\lambda$/4, then the distance of TX antenna B from the RX antenna is 3$\lambda$/4, or 3 times the distance. This would result in the signal 23 at the RX antenna from TX antenna A being in the order of 9 dB higher than the signal 25 from TX antenna B 13. If the relative distances were 2$\lambda$ and 5$\lambda$/2, then the difference is less than 2 dB, but the antenna spacing has increased.

Therefore in order to achieve deep attenuation, the TX signal 34 applied to TX antenna B would need to be attenuated such that the signals received at the RX antenna from TX antennas A and B are equal in amplitude.

The example given shows TX antennas 12 and 13 in line, it is possible to have the antennas located at the corners of a triangle, as illustrated in FIG. 2.

The distance from TX antenna A to the RX antenna must be an odd multiple of $\lambda$/2 compared to the distance from TX antenna B to the RX antenna. In FIG. 2 the distance between RX antenna A and TX antenna B 13 is D and the distance between RX antenna A and TX antenna B 13 is $\{(2N+1)*\lambda/2\}+D$, N can take any integer value as well as a value of zero. The separation of the two TX antennas must be sufficient such that the signals are not correlated in the far field. The separation distance so as to assume the signals will be uncorrelated is usually assumed to be $\lambda$/2 (reference "Foundations of Mobile Radio Engineering", Michael Yacoub, 1993 CRC Press, page 179). It is also possible to have the TX antennas and the RX antenna in opposite polarities. The RX antenna could be positioned for horizontal polarization and the two TX antennas could be positioned for vertical polarization, for example. This reduces the unwanted coupling between the antennas.

It is also possible to use two TX antennas and one RX antenna with the same equidistance spacing, as shown in FIG. 3 that shows a prior art communication system 10'.

The two TX antennas, A and B 12 and 13, are equidistant, D, from the RX antenna 11. The signal to be transmitted 31 is split into two equal components. The signal applied to TX antenna A is first subjected to a phase change 16 of +$\pi$/2 radians and the signals applied to TX antenna B is first subjected to a phase change 17 of –$\pi$/2 radians. The net result is that the two signals will be received at the RX antenna 11 at equal amplitude but at a phase difference of it radians, i.e. ideally out of phase, and hence will cancel.

Other cancellation schemes have been proposed. For example, Osama N. Alrabadi et al, ("Breaking the Transmitter-Receiver Isolation Barrier in Mobile Handsets with Spatial Duplexing", Smart Antenna FrontEnd (SAFE) project within the Danish National Advanced Technology Foundation—High Technology Platform), describe a scheme where the TX is equipped with extra redundant antennas and by properly weighting the TX antennas the TX signal is selectively attenuated in the RX direction. Similar to the more simple cancellation scheme described above, this scheme relies on multiple TX antennas.

SUMMARY OF THE INVENTION

According to an embodiment of the invention there may be provided a communication system that comprises a transmit antenna, a radio frequency (RF) phase shifting module, an RF combiner, a first receive antenna and a second receive antenna; wherein the first and second receive antennas are located at a same distance from the transmit antenna; wherein the first and second receive antennas are arranged to receive first and second leakage signals resulting from a transmission of RF radiation by the transmit antenna; wherein the RF phase shifting module may be configured to receive signals from the first and second receive antennas, to phase shift signals from at least one of first and second receive antennas to provide intermediate RF signals; wherein the phase shift caused by the RF phase shifting module introduces a destructive phase shift between the first and second leakage signals; wherein the RF combiner may be configured to add the intermediate RF signals to provide combined RF signals.

The RF phase shifting module may be configured to phase shift the signals from at least one of first and second receive antennas to introduce a phase shift of degrees between the signals from the first receive antenna and the signals from the second receive antenna.

The RF phase shifting module may be configured to phase shift the signals from only one of the first and second receive antennas.

The transmit antenna may be oriented in relation to the first and second receive antennas.

The transmit antenna may be orthogonal to the first and second receive antennas.

The transmit antenna, the first receive antenna and second receive antenna are mutually orthogonal.

At least two antennas out of the transmit antenna, the first receive antenna and the second receive antennas are configured to receive different polarization components of RF radiation.

The communication system further may include a controller that may be arranged to adjust the phase shift applied on the signals from at least one of first and second receive antennas.

The controller may be arranged to adjust the phase shift in response to an analysis of the combined RF signals.

The RF phase shifting module may be configured to phase shift the signals from both first and second receive antennas.

The signals at the first receive antenna may pass through a first path that ranges between the first receive antenna and a first input port of the RF combiner; wherein the signals at the second receive antenna may pass through a second path that ranges between the second receive antenna and a second input port of the RF combiner.

The first and second paths may exhibit substantially a same amplitude gain.

The communication system may be arranged to generate the intermediate RF signals without introducing a change between amplitude gains of the first and second paths.

The RF phase shifting module may be arranged to output first RF intermediate signals to a first port of the RF combiner and to output second RF intermediate signals to a second port of the RF combiner.

The first intermediate RF signals represent the signals from the first receive antenna and wherein the second intermediate RF signals represent the signals from the second receive antenna.

The first intermediate RF signals represent the signals from the first and second receive antennas and wherein the second intermediate RF signals represent the signals from the second and first receive antennas.

The RF phase shifting module may include a first RF phase shifter, a second RF phase shifter and a ninety degrees hybrid RF coupler.

The ninety degrees hybrid RF coupler may include a first RF coupler input port, a second RF coupler input port, a first RF coupler output port, a second RF coupler output port; wherein the first RF phase shifter may be coupled between the first receive antenna and the first RF coupler input port; wherein the second phase shifter may be coupled between the second RF coupler output port and a second input port of the RF combiner; wherein the second RF coupler input port may be coupled to the second receive antenna; and wherein the first RF coupler output port may be coupled to a first input port of the RF combiner.

The communication system further may include a controller that may be arranged to adjust the phase shift applied on the signals from at least one of first and second receive antennas.

The controller may be arranged to adjust the phase shift in response to an analysis of the combined RF signals.

According to an embodiment of the invention there may be provided a method for mitigating leakage signals, the method may include receiving from first and second receive antennas first and second leakage signals resulting from a transmission of radio frequency (RF) radiation by a transmit antenna; wherein the first and second receive antennas and the transmit antenna belong to a communication system; wherein the first and second receive antenna are located at a same distance from the transmit antenna; receiving by an RF phase shifting module of the communication system signals from the first and second receive antennas; phase shifting the signals from at least one of first and second receive antennas to provide intermediate RF signals; wherein the phase shifting introduces a destructive phase shift between the first and second leakage signals; and adding, by an RF combiner of the communication system the intermediate RF signals to provide combined RF signals.

According to an embodiment of the invention there may be provided a communication system that may include a transmit antenna, a radio frequency (RF) phase shifting module, an RF combiner, a first receive antenna, a compensation circuit, and a second receive antenna; wherein the first and second receive antennas are located at a first and second distances respectively from the transmit antenna; wherein the first and second distances differ from each other; wherein the compensation circuit unit may be arranged to at least partially compensate for a difference between the first and second distances; wherein the first and second receive antennas are arranged to receive first and second leakage signals resulting from a transmission of RF radiation by the transmit antenna; wherein the RF phase shifting module may be configured to receive signals from the first and second receive antennas, to phase shift signals from at least one of first and second receive antennas to provide intermediate RF signals; wherein the phase shift caused by the RF phase shifting module introduces a destructive phase shift between the first and second leakage signals; wherein the RF combiner may be configured to add the intermediate RF signals to provide combined RF signals.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 8-10 illustrate various signals of the communication system of FIG. 7 according to an embodiment of the invention.

FIG. 15 illustrates a method according to an embodiment of the invention.

DETAILED DESCRIPTION OF THE DRAWINGS

Figure 1:
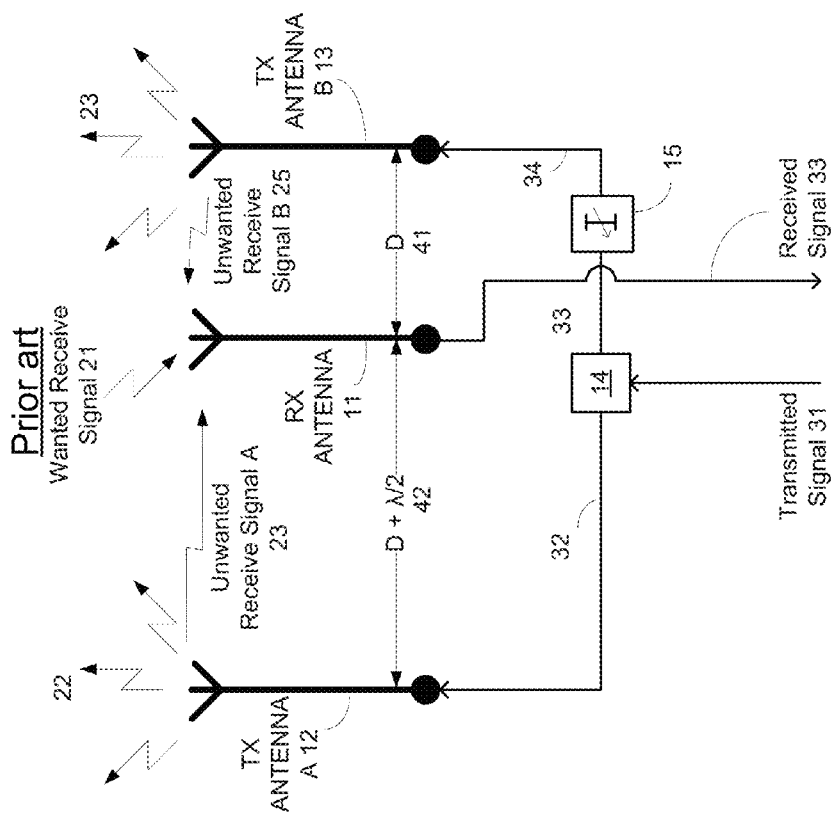
FIG. 1 illustrates a prior art communication system.
Figure 2:
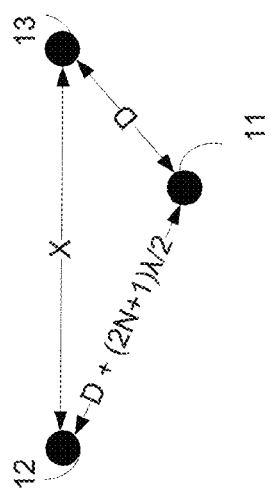
FIG. 2 illustrates a prior art arrangement of antennas.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

Figure 5:
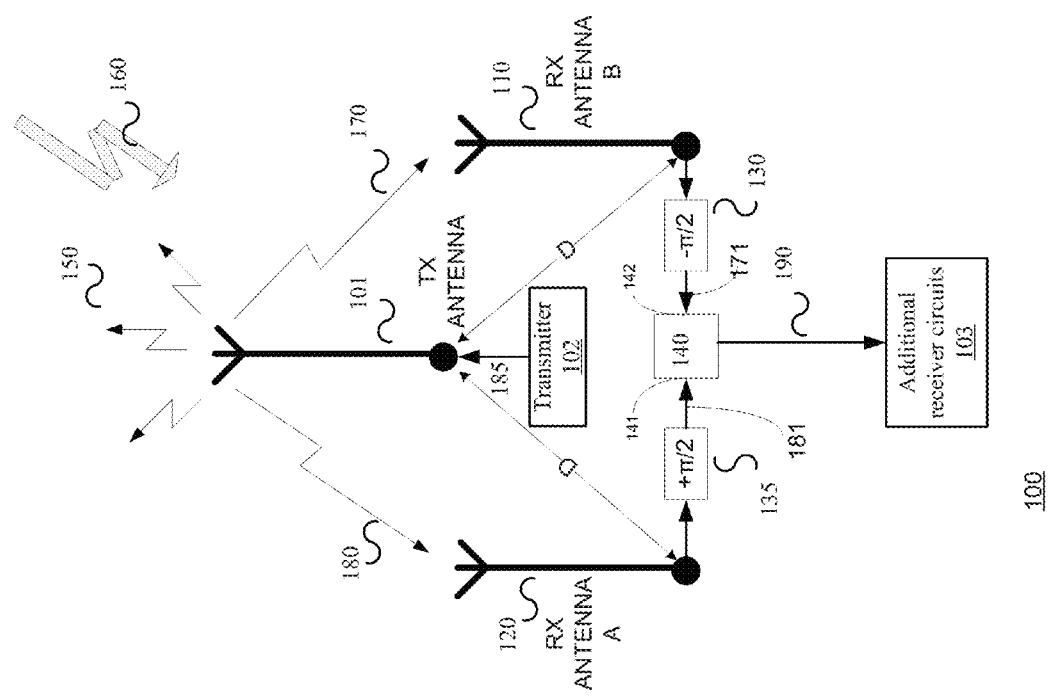
FIG. 5 illustrates a communication system according to an embodiment of the invention.

FIG. 5 illustrates a communication system 100 according to an embodiment of the invention.

The communication system 100 includes a transmitter 102, a single transmit antenna 101 (TX antenna), two receive antennas (RX antenna A 120 and RX antenna B 110), RF combiner 140, an RF phase shifting module (that includes two phase shifters 130 and 135) and additional receiver circuits 103. The additional receiver circuits 103 may include an RF to baseband converter, a baseband to digital signals converter and digital circuits for generating a reconstructed digital signal that should represent the desired signal 160.

The TX antenna 101 is situated equally spaced from two RX antennas 110 and 120. The signal to be transmitted 185 is applied to the TX antenna 101. The TX antenna 101 transmits RF radiation 150.

RX antennas A and B 120 and 110 receive a desired signal 160 which is a far field signal. In this case, the frequencies of the RF radiation 150 and the desired signal 160 are similar and close enough such that conventional filtering in order to separate them is either impossible or costly.

Leakage signal (unwanted transmission) 170 of the transmitted RF radiation 150 is also received at RX antenna B 110, and similarly leakage signal (unwanted reception) 180 of the transmitted RF radiation 150 is received at RX antenna A 120.

At the output of RX antenna B, 110, the received signal, which is made up of signals 160 and 170, are subjected to a $-\pi/2$ radians phase change 130.

At the output of RX antenna A, 120, the received signal, which is made up of signals 160 and 180, are subjected to a $+\pi/2$ radians phase change 135.

The two phase changed signals from the RX antennas A and B 110 and 120 are then applied to the RF combiner 140.

As the TX antenna 101 is equidistant from the two RX antennas 110 and 120, the amplitudes and phases of the unwanted received TX signals 170 and 180 at the two RX antennas 110 and 120, are equal. After the phases are adjusted in 130 and 135 the inputs to the RF combiner 140 are such that the unwanted TX signals are equal in amplitude and it radians out of phase. The result is that at the output signal (combined RF signal) 190 of the RF combiner 140 the signal component of the unwanted TX signal is greatly reduced.

The desired receive signal 160 is received at the two RX antennas 110 and 120 and also subjected to phase changes in 130 and 135 to provide RF intermediate signals 181 and 171. The wanted received signal 160 is from the far field whereas the unwanted TX signals 170 and 180 are from the near field. The result is that at the output of the combiner 140, the signal will consist of the wanted received signal 160 and a component of the unwanted signal 150 that is very much reduced in amplitude. The combined RF signals 190 will be a summation of the signals of the two RX antennas. If they are spaced sufficiently, then the far field signal will be uncorrelated due to scattering and the signals will effectively add. A further improvement is to use orthogonal polarity for the TX and RX antennas.

While FIG. 5 illustrates a pair of 90 degrees phase shifters 130 and 135, it is noted that a single 180 degrees phase shifter may be applied on signals from only a single antenna. Any other arrangement of phase shifters may be applied.

In FIG. 5 the signals at the first RX antenna pass through a first path (that includes first phase shifter 135) that ranges between the first RX antenna and a first input port 141 of the RF combiner 140. The signals at the second RX antenna pass through a second path (that includes second phase shifter 130) that ranges between the second RX antenna and a second input port 142 of the RF combiner. The first and second paths may exhibit substantially a same amplitude gain.

The communication system 100 may be arranged to generate the intermediate RF signals 171 and 181 without introducing a change between amplitude gains of the first and second paths.

Figure 6:
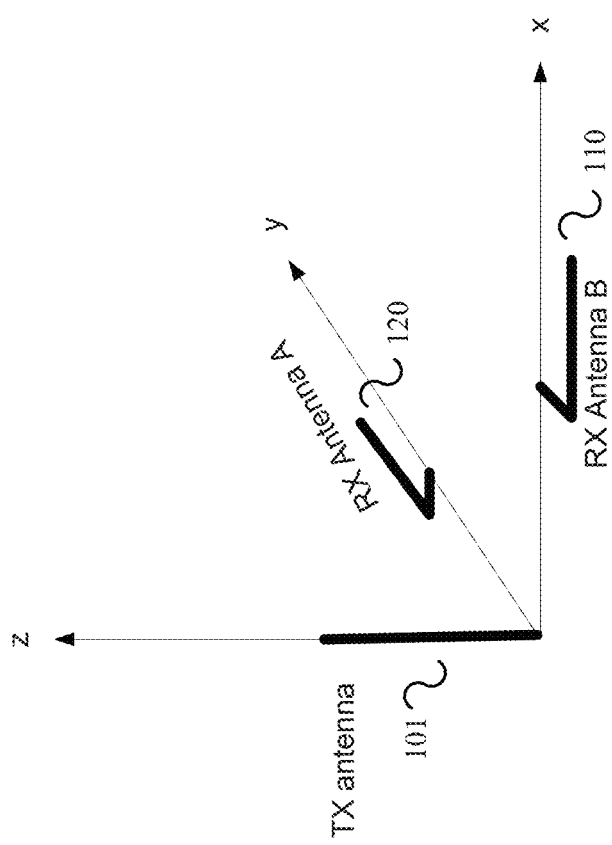
FIG. 6 illustrates an arrangement of antennas according to an embodiment of the invention.

FIG. 6 illustrates the TX antenna 101, and the two RX antennas 120 and 110 according to an embodiment of the invention. All the antennas are orthogonal to each other. FIG. 6 illustrates these antennas as being poles—but other shapes antennas may be used.

TX antenna 101 is shown in the vertical orientation, or on the z-axis. RX antenna A 120 is shown in the horizontal orientation along the y-axis. RX antenna B 110 is shown also in the horizontal orientation along the x-axis. The distance between TX antenna 101 and either of the RX antennas 120 and 110 is the same, D.

Figure 4:
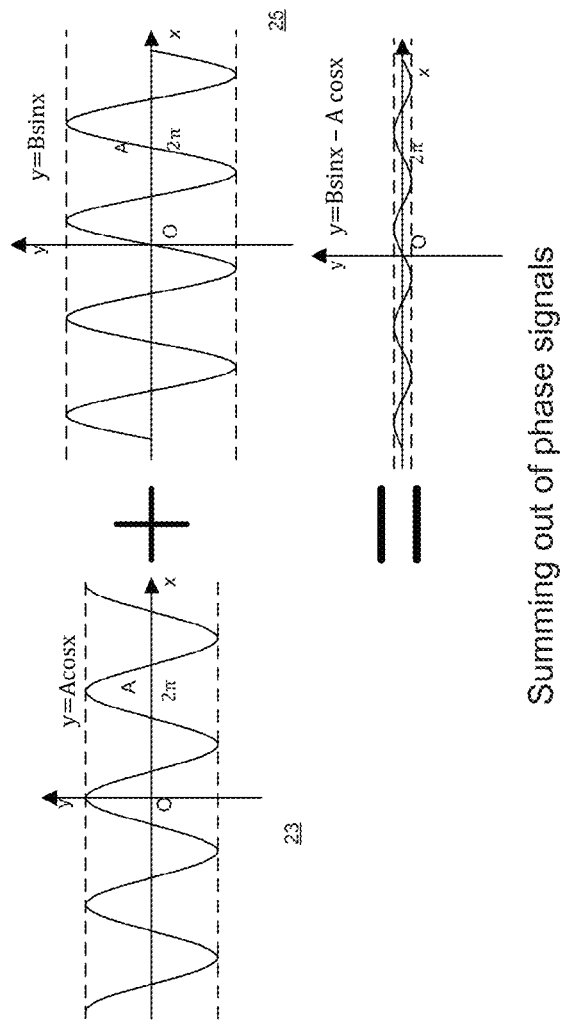
FIG. 4 illustrates a summation of leakage signals by a receive antenna.

In the near field, the signals 180 and 170 that are being emitted by the TX antenna 101, will therefore be received at antennas 120 and 110 at equal amplitude. When considering the desired (far field) signal 160, the two RX antennas 120 and 110 provide both spatial and polarized diversity, thus improving the receive performance of the combined RF signal 190 of FIG. 4.

Figure 7:
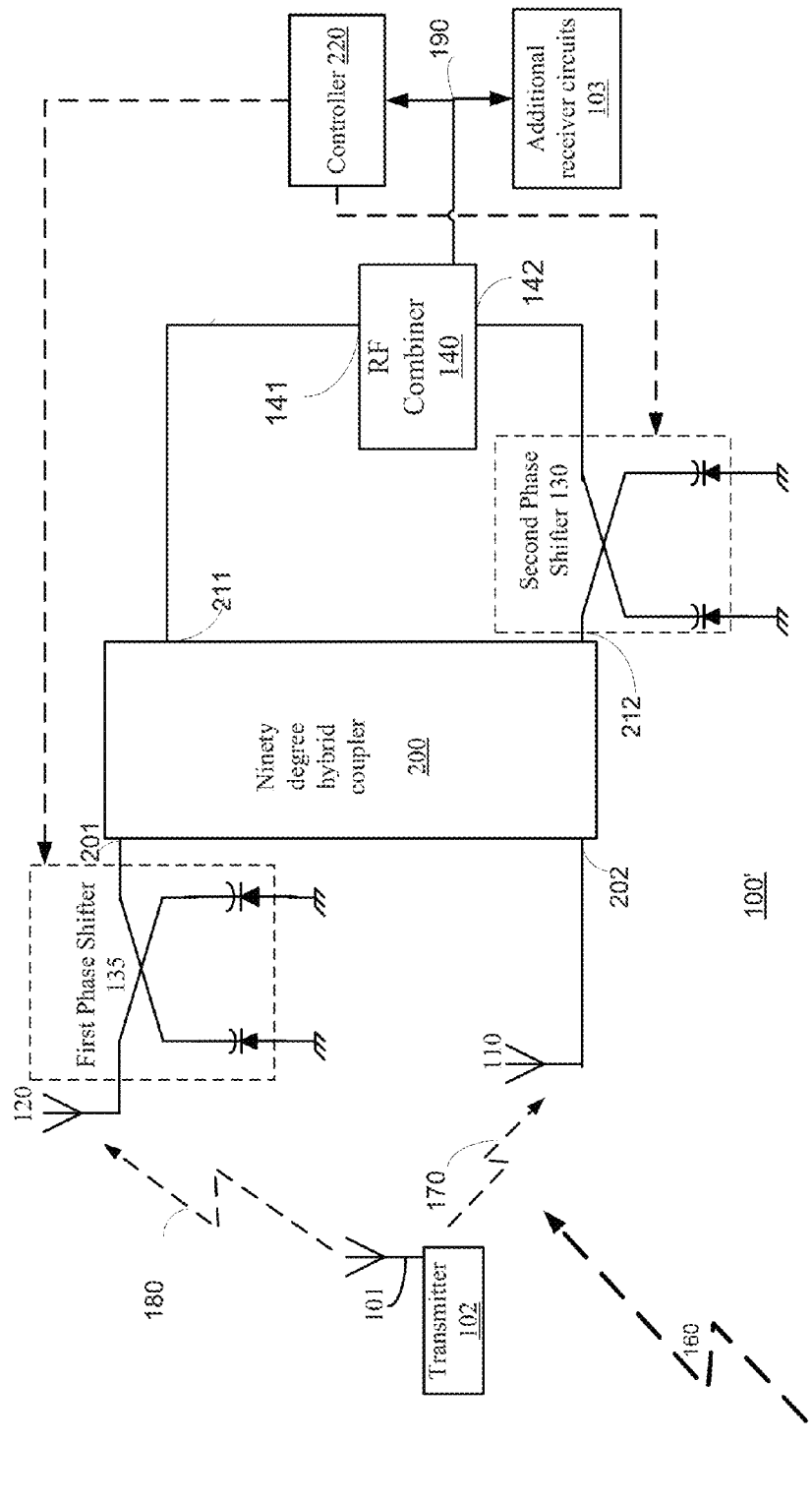
FIG. 7 illustrates a communication system according to an embodiment of the invention.

FIG. 7 illustrates a communication system 100' according to an embodiment of the invention.

Communication system 100' includes a transmitter 102, a single transmit antenna 101 (TX antenna), two receive antennas (RX antenna A 120 and RX antenna B 110), RF combiner 140, a RF phase shifting module and additional receiver circuits 103.

The RF phase shifting module includes two phase shifters 130 and 135 and a ninety degrees hybrid RF coupler 200.

The ninety degrees hybrid RF coupler 200 has a first RF coupler input port 201, a second RF coupler input port 202, a first RF coupler output port 211 and a second RF coupler output port 212.

A first input signal that enters the first RF coupler input port 201 is split to first and second components of the same amplitude but of phases that differ from each other by ninety degrees. The first component (having the same phase as the first input signal) is outputted via the first RF coupler output 211 port while the second output component (phase shifted by ninety degrees in relation to the first input signal) is outputted via the second RF coupler output port 212.

A second input signal that enters the second RF coupler input port 202 is split to first and second components of the same amplitude but of phases that differ from each other by ninety degrees. The first component (having the same phase as the second input signal) is outputted via the second RF coupler output 212 port while the second output component (phase shifted by ninety degrees in relation to the second input signal) is outputted via the first RF coupler output port 211.

The first RF phase shifter 135 is coupled between the first receive antenna 120 and the first RF coupler input port 201. The second phase shifter 130 is coupled between the second RF coupler output port 212 and a second input port of the RF combiner 140. The second RF coupler input port 202 is coupled to the second receive antenna 110. The first RF coupler output port 211 is coupled to a first input port of the RF combiner 140.

Communication system 100' cancels the unwanted signals without using attenuators or amplifiers.

FIG. 7 also shows a controller 220 that is arranged to receive a sample of the RF combined signals (outputted from the RF combiner) and in response to the sample try to adjust the phase shifts applied by first and second phase shifters 130 and 135. The adjustment may be executed during a calibration period, during multiple calibration periods, may be automatically initiated, may be initiated by a user of the communication system, and the like. The calibration may be executed in multiple iterations—until a desired cancellation is obtained, until a predefined number of iterations is reached, and the like.

Figure 10:
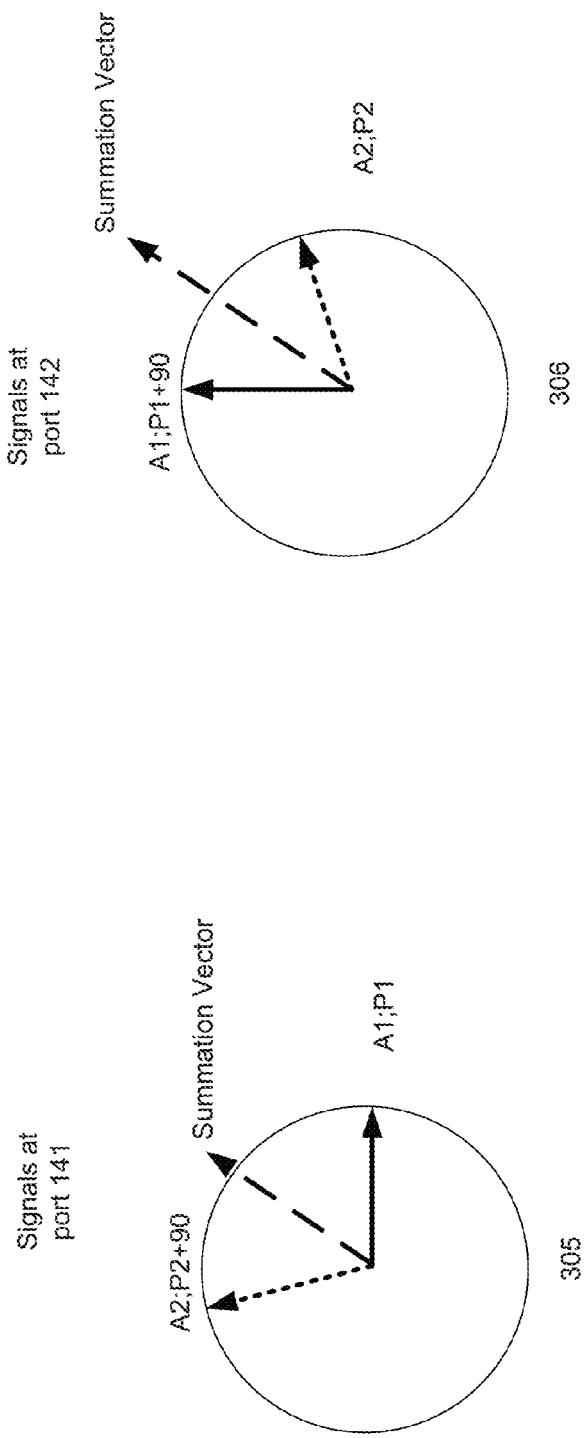

FIG. 8-10 illustrates various signals of the communication system of FIG. 7 according to an embodiment of the invention.

In these figures A1 is the amplitude of leakage signal 180, P1 is the phase of leakage signal 180, A2 is the amplitude of leakage signal 170, P2 is the phase of leakage signal 170, and the term +90 represents a ninety degrees phase shift. Each summation vector is the sum of the leakage signals components of the combined RF signal at input ports 141 and 142 of RF combiner 140.

At the first input port 141 of the RF combiner 140 and assuming that no phase shift is applied by the first phase shifter the leakage signals component of the RF combined signal 190 will be a vectorial sum of (A1; P1) and (A2;P2+90°).

At the second input port 142 of the RF combiner 140 and assuming that no phase shift is applied by the second phase shifter the leakage signals component of the RF combined signal 190 will be a vectorial sum of (A2;P2) and (A1; P1+90°).

FIG. 8 includes two polar diagrams 301 and 302 that illustrate the case A1=A2 and P1=P2. In this case the signals inputted to the RF combiner 140 would cancel each other as the RF combiner 140 has a 180 degree delay between his input ports.

FIG. 9 includes two polar diagrams 303 and 304 that illustrate the case A1≠A2 and P1=P2. Without introducing a phase shift (by any one of phase shifters 130 and 135) the leakage signals component of the RF combined signal 190 will be a vectorial sum of leakage components that differ from each other by phase and their summation will not cancel them. In this case a cancellation of the leakage components can be achieved by adjusting the second phase shifter 130 to match the phases of the intermediate RF signals at the first and second input ports 141 and 142 of the RF combiner 140.

FIG. 10 includes two polar diagrams 305 and 306 that illustrate the case A1=A2 and P1≠P2. Without introducing a phase shift (by any one of phase shifters 130 and 135) the leakage signals component of the RF combined signal 190 will be a vectorial sum of leakage components that differ from each other by amplitude and their summation will not cancel them. In order to achieve cancellation the first phase shifter has to be adjusted so P1=P2.

In case A1≠A2 and P1≠P2 both phase shifters 130 and 135 should to be adjusted to achieve cancellation.

Figure 11:
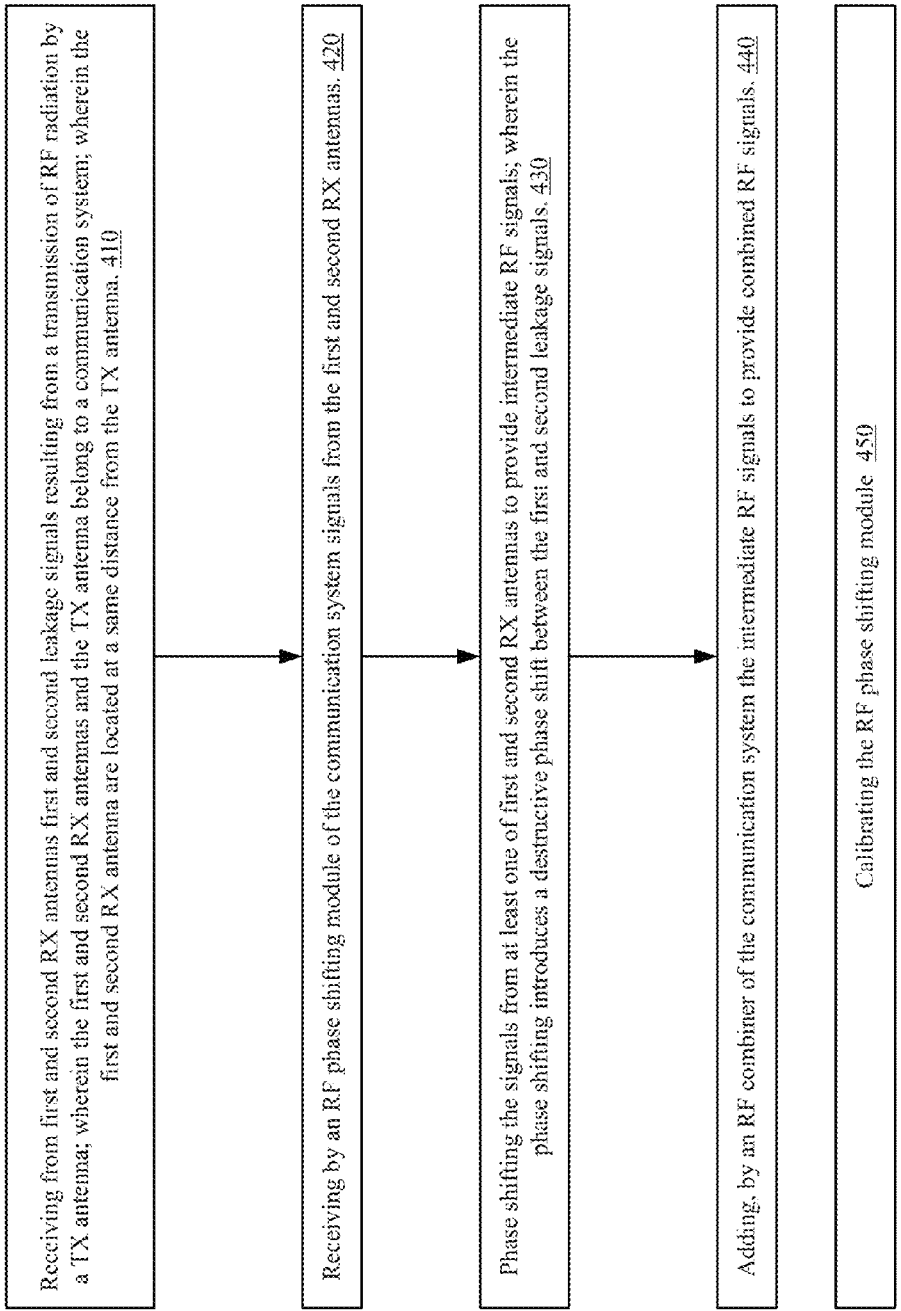
FIG. 11 illustrates a method according to an embodiment of the invention.

FIG. 11 illustrates method 400 according to an embodiment of the invention.

Method 400 may be executed by any of the communication systems of FIGS. 5 and 7.

Method 400 is for mitigating leakage signals, and may start by stage 410 of receiving from first and second receive antennas first and second leakage signals resulting from a transmission of radio frequency (RF) radiation by a transmit antenna; wherein the first and second receive antennas and the transmit antenna belong to a communication system; wherein the first and second receive antenna are located at a same distance from the transmit antenna.

Stage 410 may be followed by stage 420 of receiving by an RF phase shifting module of the communication system signals from the first and second receive antennas.

Stage 420 may be followed by stage 430 of phase shifting the signals from at least one of first and second receive antennas to provide intermediate RF signals; wherein the phase shifting introduces a destructive phase shift between the first and second leakage signals.

Stage 430 may be followed by stage 440 of adding, by an RF combiner of the communication system the intermediate RF signals to provide combined RF signals.

Method 400 may also include stage 450 of calibrating the RF phase shift module. Non-limiting examples of the calibrations are illustrated in FIGS. 6-10 and the associated text.

According to an embodiment of the invention the first and second RX antennas are located at different distances from the TX antenna and the communication system includes a compensation circuit for at least partially compensating for the difference between the distances. The compensation circuit may be an attenuator, a delay unit of a combination thereof. It is noted that the delay for signals received from the closer RX antenna can be applied, at least in part, by the RF phase shifting module.

Figure 3:
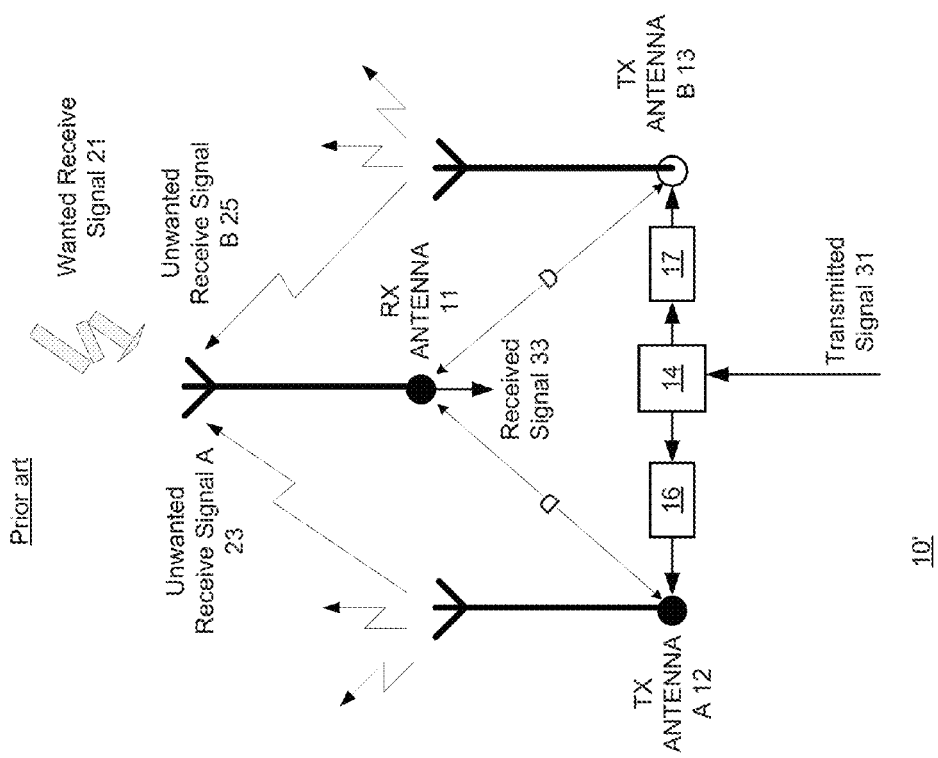
FIG. 3 illustrates a prior art communication system.
Figure 12:
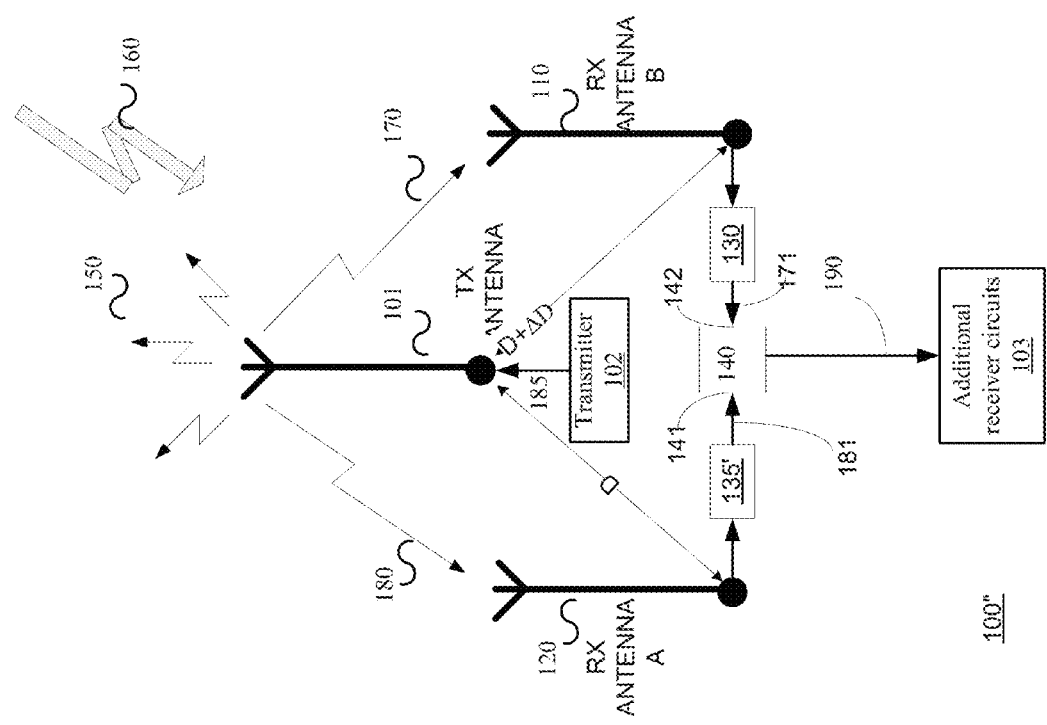
FIG. 12 illustrates a communication system according to an embodiment of the invention.

FIG. 12 illustrates a communication system 100" that differs from the communication system 100 of FIG. 3 by including, instead of phase shifter 135 a compensation circuit 135'. The compensation circuit 135' may include phase shifter 135 and an attenuator.

Figure 13:
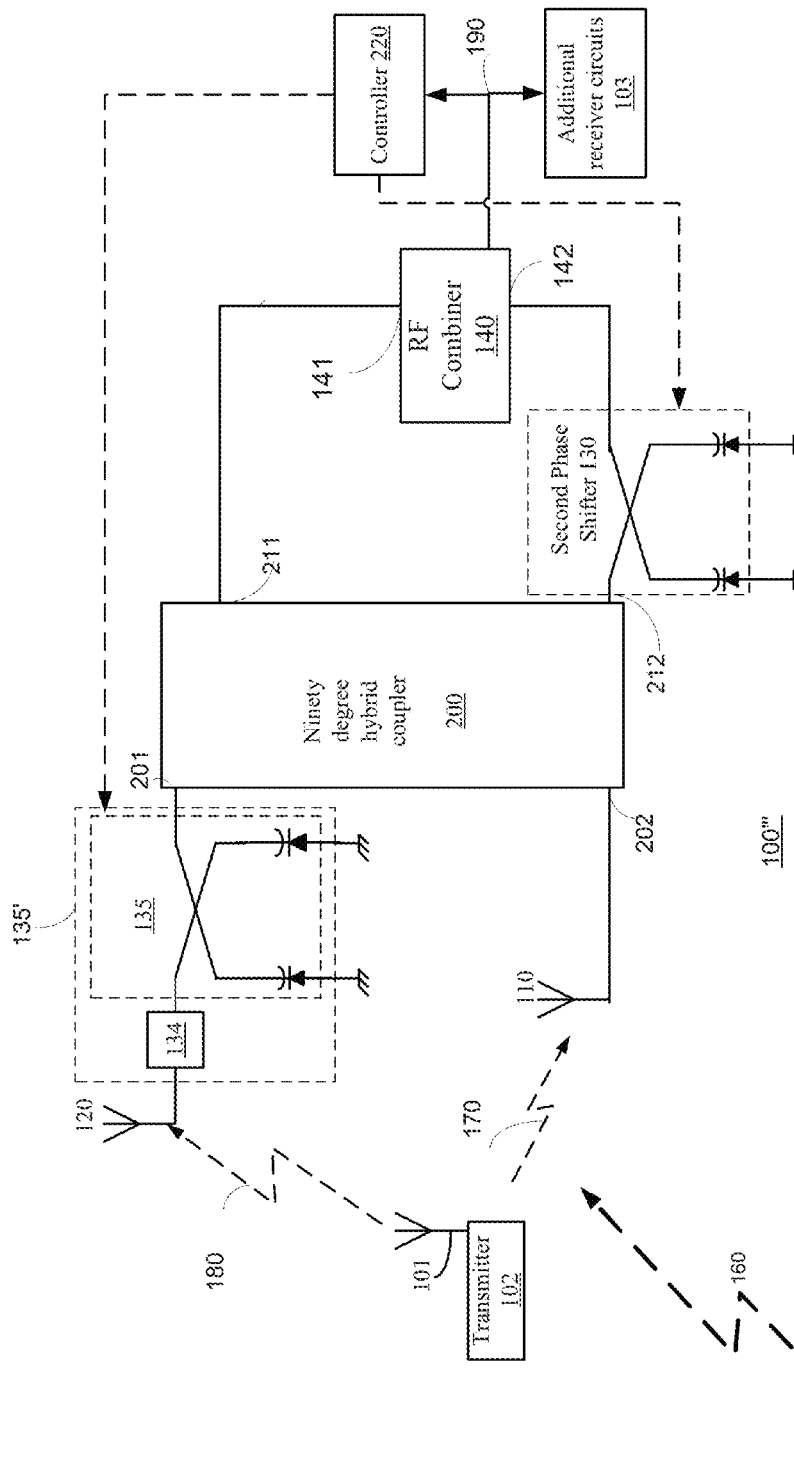
FIG. 13 illustrates a communication system according to an embodiment of the invention.

FIG. 13 illustrates a communication system 100''' that differs from the communication system 100' of FIG. 7 by including, instead of phase shifter 135 a compensation circuit 135' that includes phase shifter 135 and an attenuator 134.

It is noted that an attenuator can be provided only in a path that includes the second phase shifter.

It is further noted that attenuators may be provided in both paths—both in the path that includes the first phase shifter 135 and also in the path that includes the second phase shifter.

Figure 14:
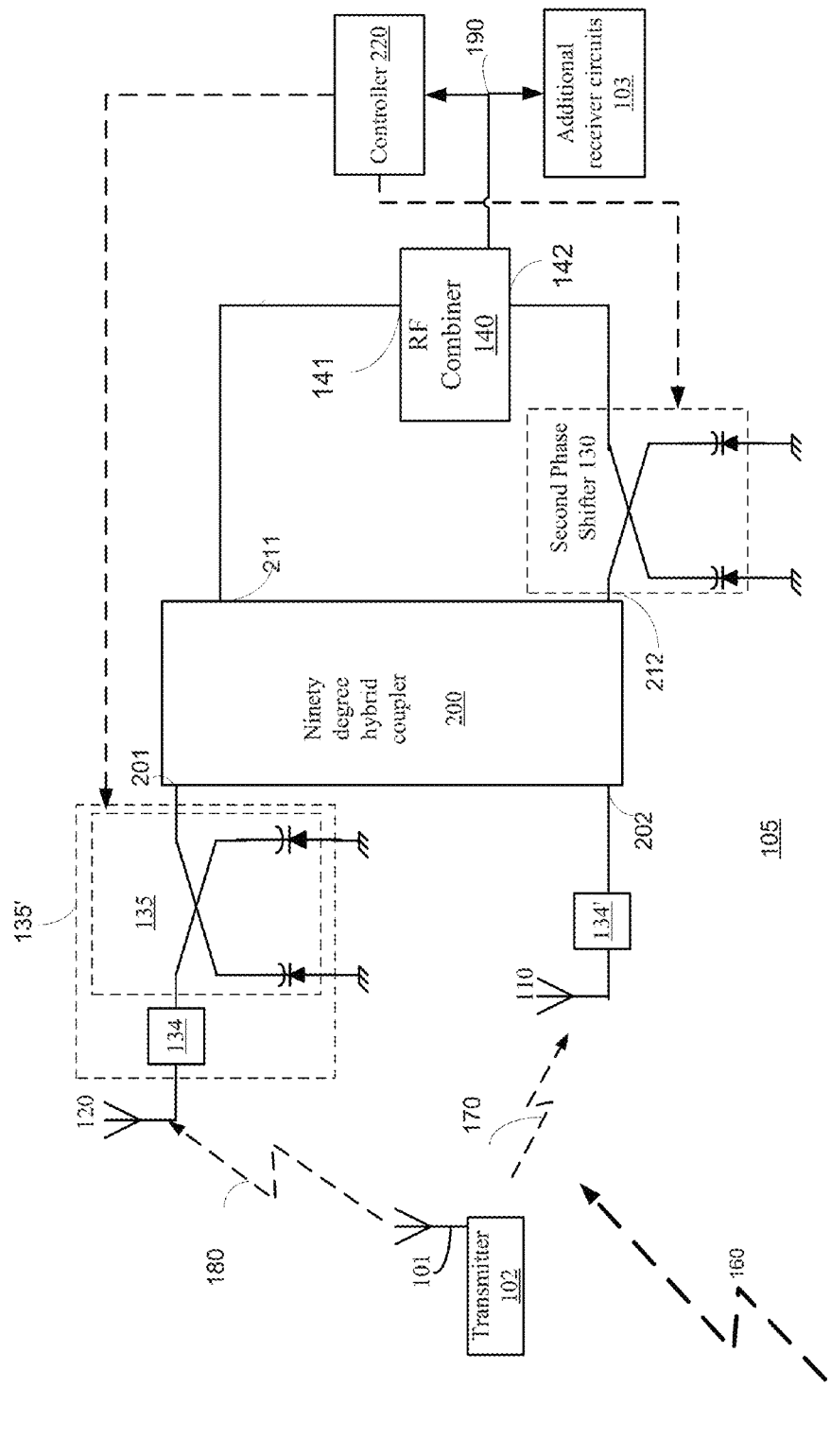
FIG. 14 illustrates a communication system according to an embodiment of the invention.

FIG. 14 illustrates a communication system 105 that differs from the communication system 100' of FIG. 7 by (a) including, instead of phase shifter 135 a compensation circuit 135' that includes phase shifter 135 and an attenuator 134, and (b) by including an attenuator 134' between RX antenna B 110 and the second input port 202 of the ninety degrees hybrid RF coupler 200. This attenuator may be positioned anywhere in the path that includes the second phase shifter 130—for example, between the ninety degrees hybrid RF coupler 200 and the second phase shifter 130, between the second phase shifter and the RF combiner 140, as a part of a compensation circuit that include the attenuator and the second phase shifter 130 and the like.

A pair of attenuators may be added to the communication system of FIG. 5—one per each path leading to an input of RF combiner 140.

FIG. 15 illustrates method 600 according to an embodiment of the invention.

Method 600 may be executed by any of the communication systems of FIGS. 12, 13 and 14.

Method 600 is for mitigating leakage signals, and may start by stage 610 of receiving from first and second receive antennas first and second leakage signals resulting from a transmission of radio frequency (RF) radiation by a transmit antenna; wherein the first and second receive antennas and the transmit antenna belong to a communication system; wherein the first and second receive antenna are located at different distances from the transmit antenna.

Stage 610 may be followed by stage 420 of receiving by an RF phase shifting module of the communication system signals from the first and second receive antennas.

Stage 420 may be followed by stage 630 of compensating for the differences in distances between the TX antenna and the respective first and second RX antennas and phase shifting the signals from at least one of first and second RX antennas to provide intermediate RF signals; wherein the phase shifting introduces a destructive phase shift between the first and second leakage signals. The compensating may include phase shifting and/or amplitude change. The compensating and the phase shifting may executed separately from each other, in a partially overlapping manner or in an integrated manner.

Stage 630 may be followed by stage 440 of adding, by an RF combiner of the communication system the intermediate RF signals to provide combined RF signals.

Method 600 may also include stage 450 of calibrating the RF phase shift module. Non-limiting examples of the calibrations are illustrated in FIGS. 6-10 and the associated text.

Any combination of any stages of methods 400 and 600 may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A communication system that comprises a transmit antenna, a radio frequency (RF) phase shifting module, an RF combiner, a first receive antenna and a second receive antenna;
   wherein the first and second receive antennas are located at a same distance from the transmit antenna;
   wherein the first and second receive antennas are arranged to receive first and second leakage signals resulting from a transmission of RF radiation by the transmit antenna;
   wherein the RF phase shifting module is configured to receive signals from the first and second receive antennas, to phase shift signals from at least one of first and second receive antennas to provide intermediate RF signals; wherein the phase shift caused by the RF phase shifting module introduces a destructive phase shift between the first and second leakage signals;
   wherein the RF combiner is configured to add the intermediate RF signals to provide combined RF signals.

2. The communication system according to claim 1, wherein the RF phase shifting module is configured to phase shift the signals from at least one of first and second receive antennas to introduce a phase shift of 180 degrees between the signals from the first receive antenna and the signals from the second receive antenna.

3. The communication system according to claim 1, wherein the RF phase shifting module is configured to phase shift the signals from only one of the first and second receive antennas.

4. The communication system according to claim 1, wherein the transmit antenna is oriented in relation to the first and second receive antennas.

5. The communication system according to claim 1, wherein the transmit antenna is orthogonal to the first and second receive antennas.

6. The communication system according to claim 1, wherein the transmit antenna, the first receive antenna and second receive antenna are mutually orthogonal.

7. The communication system according to claim 1, wherein at least two antennas out of the transmit antenna, the first receive antenna and the second receive antennas are configured to receive different polarization components of RF radiation.

8. The communication system according to claim 1 further comprising a controller that is arranged to adjust the phase shift applied on the signals from at least one of first and second receive antennas.

9. The communication system according to claim 8 wherein the controller is arranged to adjust the phase shift in response to an analysis of the combined RF signals.

10. The communication system according to claim 1, wherein the RF phase shifting module is configured to phase shift the signals from both first and second receive antennas.

11. The communication system according to claim 10 wherein the signals the first receive antenna pass through a first path that ranges between the first receive antenna and a first input port of the RF combiner; wherein the signals the second receive antenna pass through a second path that ranges between the second receive antenna and a second input port of the RF combiner.

12. The communication system according to claim 10 wherein the first and second paths exhibit substantially a same amplitude gain.

13. The communication system according to claim 11 wherein the communication system is arranged to generate the intermediate RF signals without introducing a change between amplitude gains of the first and second paths.

14. The communication system according to claim 1 wherein the RF phase shifting module is arranged to output first RF intermediate signals to a first port of the RF combiner and to output second RF intermediate signals to a second port of the RF combiner.

15. The communication system according to claim 14 wherein the first intermediate RF signals represent the signals from the first receive antenna and wherein the second intermediate RF signals represent the signals from the second receive antenna.

16. The communication system according to claim 14 wherein the first intermediate RF signals represent the signals from the first and second receive antennas and wherein the second intermediate RF signals represent the signals from the second and first receive antennas.

17. The communication system according to claim 14 wherein the RF phase shifting module comprises a first RF phase shifter, a second RF phase shifter and a ninety degrees hybrid RF coupler.

18. The communication system according to claim 17 wherein the ninety degrees hybrid RF coupler comprises a first RF coupler input port, a second RF coupler input port, a first RF coupler output port, a second RF coupler output port;
wherein the first RF phase shifter is coupled between the first receive antenna and the first RF coupler input port;
wherein the second phase shifter is coupled between the second RF coupler output port and a second input port of the RF combiner;
wherein the second RF coupler input port is coupled to the second receive antenna; and
wherein the first RF coupler output port is coupled to a first input port of the RF combiner.

19. The communication system according to claim 18 further comprising a controller that is arranged to adjust the phase shift applied on the signals from at least one of first and second receive antennas.

20. The communication system according to claim 19 wherein the controller is arranged to adjust the phase shift in response to an analysis of the combined RF signals.

21. A method for mitigating leakage signals, the method comprises:
receiving from first and second receive antennas first and second leakage signals resulting from a transmission of radio frequency (RF) radiation by a transmit antenna; wherein the first and second receive antennas and the transmit antenna belong to a communication system;
wherein the first and second receive antenna are located at a same distance from the transmit antenna;
receiving by an RF phase shifting module of the communication system signals from the first and second receive antennas;
phase shifting the signals from at least one of first and second receive antennas to provide intermediate RF signals; wherein the phase shifting introduces a destructive phase shift between the first and second leakage signals; and
adding, by an RF combiner of the communication system the intermediate RF signals to provide combined RF signals.

22. A communication system that comprises a transmit antenna, a radio frequency (RF) phase shifting module, an RF combiner, a first receive antenna, a compensation circuit, and a second receive antenna;
wherein the first and second receive antennas are located at a first and second distances respectively from the transmit antenna; wherein the first and second distances differ from each other; wherein the compensation circuit unit is arranged to at least partially compensate for a difference between the first and second distances;
wherein the first and second receive antennas are arranged to receive first and second leakage signals resulting from a transmission of RF radiation by the transmit antenna;
wherein the RF phase shifting module is configured to receive signals from the first and second receive antennas, to phase shift signals from at least one of first and second receive antennas to provide intermediate RF signals; wherein the phase shift caused by the RF phase shifting module introduces a destructive phase shift between the first and second leakage signals;
wherein the RF combiner is configured to add the intermediate RF signals to provide combined RF signals.

* * * * *